United States Patent [19]

Lopez De Romana

[11] Patent Number: 4,499,569
[45] Date of Patent: Feb. 12, 1985

[54] WRITING BEAM FOCUS MONITOR

[75] Inventor: Eduardo A. Lopez De Romana, Torrance, Calif.

[73] Assignee: Discovision Associates, Costa Mesa, Calif.

[21] Appl. No.: 415,501

[22] Filed: Sep. 7, 1982

[51] Int. Cl.³ .............................................. G11B 7/00
[52] U.S. Cl. ...................................... 369/45; 358/342
[58] Field of Search ............... 369/45, 46, 54, 121; 358/342; 250/201

[56] References Cited

FOREIGN PATENT DOCUMENTS 133305 10/1979 Japan ................................. 369/45

Primary Examiner—Robert L. Richardson
Attorney, Agent, or Firm—Ronald J. Clark

[57] ABSTRACT

A method and apparatus for monitoring the focus condition of a writing light beam impinging the writing surface of a recording medium. The present invention operates on the recognition of the fact that light from a laser is very slightly divergent as it emerges from the laser. Accordingly, the reflected light from the medium is convergent as it passes in the reverse direction and it forms a real image of the source plane wave. The image is compared to a reference image indicative of proper focus, and the focus is adjusted until the image matches the reference image.

19 Claims, 6 Drawing Figures

WRITING BEAM FOCUS MONITOR

BACKGROUND OF THE INVENTION

1. Field of the Invention

The present invention relates to the writing of intelligence information on the writing surface of a recording medium. More specifically, the invention is directed to a method and means for monitoring the focussing condition of the writing light beam impinging the writing surface of the medium.

2. Description of the Prior Art

Systems for monitoring the focus condition of a light beam used in reproducing prerecorded information from a videodisc by a videodisc player are well known, and a specific example can be found in U.S. patent application Ser. No. 298,405 filed Sept. 1, 1981 now U.S. Pat. No. 4,439,848 which is a continuation of U.S. application Ser. No. 131,513 filed Mar. 18, 1980, now abandoned, which, in turn, is a continuation of U.S. Ser. No. 890,670 filed Mar. 27, 1978, now abandoned, all filed in the name of Ceshkovsky et al. In the Ceshkovsky application, a collimated reading light beam from a laser light source is directed through a diverging lens employed to shape the beam to fully fill the entrance aperture of a microscopic objective lens which, in turn, converges the beam to a focussed spot on the surface of the videodisc. As the disc rotates, the pits or bumps along the track of the disc cause intensity modulation of the reflected beam which progresses along a portion of the incident light beam path until it reaches a polarizing cube which diverts the reflected beam out of the path of the incident beam and focusses it on a photodetector. As the intensity of the beam focussed on the photodetector varies, the intelligence information recorded on the videodisc is transformed into electrical impulses which through a series of electronic processes produces the video and audio portions of a recorded program.

In the player arrangement just described, the reflected light is split off from the incident light beam path in a region where the incident beam is diverging. In this manner, the reflected beam entering the polarizing cube, placed in the diverging portion of the incident beam, produces a converging light beam diverted to the photodetector. In analyzing the optics involved in such a system, the fact that a cone-shaped beam is produced by the diverging lens permits a pair of conjugate points to be developed, one at the surface of the videodisc and the other at the focus point on the photodetector. Thus, the light split off from the polarizing cube forms a focussed spot on the photodetector which has correspondence to the focussed spot on the disc. Of course, if the light beam is out of focus as it impinges the disc, the strength of the signal detected by the photodetector will be less. Accordingly, optimum focus and signal recovery can be gained by monitoring the signal level developed at the photodetector, adjusting the objective lens focussing the beam on the disc until a maximum signal is recovered, and then adjusting the spacing between the polarizing cube and the photodetector until the signal is again maximized. At the optimum operating point, the conjugate points of the optical path will be in focus at the surface of the disc and the photodetector simul- taneously.

In a player, the most common means of maintaining proper focus is to continually monitor the strength of the signal produced at the photodetector and, through a servo control loop, drive the objective lens along the axis of the reading beam until the recovered signal is maximized.

Another means of monitoring and maintaining focus in a videodisc player consists in passing the reflected beam of uniform divergence with circular profile through a cylindrical lens, thus increasing the divergence along the basal plane while leaving the divergence in the sagital plane unaltered. The beam is then directed through a passageway surrounded by four photosensors in quadrature, including a pair of vertically aligned sensors and a pair of horizontally aligned sensors. The beam thus illuminates the four sensors in spatial quadrature with the sensor arrangement positioned along the beam at a location where the beam is changing from basal focus to sagital focus to define a circular beam profile and cause equal outputs from the pairs of horizontal and vertical sensors. Depending on the position of the conjugate point at the disc surface then, the beam profile at the detector changes from horizontal elliptical profile to vertical elliptical profile. By electronically monitoring the difference signal between the horizontal and vertical sensor pairs, a focus error signal can be developed to return the objective lens to a position effective to cancel out any difference and return the beam to a circular profile.

All of the above-mentioned forms of maintaining focus of a light beam do so by operating in response to the condition of the reflected reading beam as it converges toward the photodetector. Furthermore, most of the known electro-optical focus monitoring and control systems employed in player apparatuses are placed in the long conjugate of the objective lens. This is made possible by the use of a beam splitting cube. The focus detectors and monitors of the prior art work effectively by analyzing changes in the divergence of the long conjugate of the objective lens thereby inferring the length of the short conjugate of the objective lens as dictated by well known laws of optics.

Another factor in the effectiveness of prior art focus detectors and monitors consists, in large part, in the strength of the signal recovered from the videodisc after impingement by the reading beam. The highly reflective metallized information-containing surface of the videodisc produces a high percentage of reflected light with which the photodetector and focussing apparatuses can reliably operate.

Since the present invention concerns the monitoring of the focus condition of a writing, or mastering, machine, there are several factors which would discourage the use of a polarizing cube at the same location along the beam path as in the disc players described above. First, the writing apparatus involves the use of a higher powered light source, 100 milliwatt argon ion laser tubes being quite common, as compared to the 1 milliwatt power capability of a reading beam of a player. Accordingly, inserting a polarizing cube and necessary quarter wave plate in the diverging portion of the writing beam, i.e., just before the objective lens, would introduce certain optical aberrations and distortions, such as the spherical aberration that can be expected after passing a light beam through any optical unit, aggravated by the large numerical aperture required in videodisc mastering, and would diminish the useful operating lifetime of the record laser due to the transfer efficiency of the polarizing cube.

The disadvantage of the spherical aberration introduced by placing a beam splitting cube in the divergent recording beam path has been recognized and overcome in the prior art by using objectives of infinitely long conjugate rather than the far more common 160 or 180 mm long conjugate. However, in such an arrangement, more elements are used, first to produce a wide collimated beam to illuminate the objective, and second to converge the diverted return beam to the focus monitor device in converging form.

Furthermore, since the disc surface upon which the writing beam is to impinge is not metallized but rather coated with a substantially clear photoresist compound, the disc surface is substantially transmissive, and making use of any possible reflected light energy is not readily apparent.

Finally, and although cost is not necessarily a large factor in the production of mastering machines, additional parts are necessary with the attendant complexities, and additional time must be invested in the assembly, alignment, and maintaining of the additional optical parts.

Because of the problems enumerated in the previous paragraph, it has been common practice in the prior art of recording laser discs to periodically determine optimum focussing position for the various optical elements affecting focus by producing a series of test discs and playing back each disc or portion thereof corresponding to a particular combination of settings for the various optical parameters, such as power and focus, involved. After locating a videodisc or portion thereof which has a high quality of reproducible signal therefrom, the log showing the various conditions and positions of the optics producing such high quality recorded program is referred to for returning the optics to that set of conditions. In this manner, although time consuming and not predictable, an acceptable focus condition is established. The empirically derived conditions necessary to produce acceptable focussing conditions, however, are extremely costly due to the labor time involved in setting up and determining the optimum focus conditions as well as in the loss of videodisc production due to down time of the mastering machine.

Accordingly, there is a need in the art to be able to quickly set the focus optics to an optimum condition on a repeated basis and to monitor the focus condition on a continuous basis.

SUMMARY OF THE INVENTION

The present invention overcomes all of the deficiencies of the prior art procedures mentioned above for effecting proper focus of a mastering machine and avoids the previously-mentioned disadvantages of inserting a separate polarizing cube and quarter wave plate, in the diverging writing beam of the writer.

As was mentioned in connection with the description of the focus monitoring systems of the prior art disc players, the condition of focus can only be monitored if the monitoring device is either at or between conjugate points of an optical system. That is, when a conically shaped optical beam is intercepted, the focus condition at one of the conjugate points can be monitored by observing the change in shape and/or size of the intercepted portion of the diverging or converging light beam. If a light beam is of a collimated form, i.e., if the beam is from a parallel-planar light source, then movement of any of the optical elements in the optical path intercept the same size and shape of light beam, and no information can be derived therefrom. It is common knowledge that the light beam from a laser source is parallel and planar, and thus it would not be expected that any focus condition of the beam after passing through a diverging lens and objective lens twice downstream from the power source whose collimated beam portion could also provide a source for focus information of the recording beam spot.

While the difficulty of extracting focus information on the upstream collimated part of the beam has been recognized, prior art technology has resorted to overcome the difficulty by placing relay lenses after a diverting beam spliter, thereby again converging the beam and thus recreating the features of the objective long conjugate.

The present invention operates on the recognition of the fact that, although for all practical purposes a light beam from a laser device is collimated, it, in fact, is very slightly divergent as it emerges from the laser resulting from diffraction of the Gaussian intensity profile plane wave that exists between the laser resonator mirrors at the beam waist and from refraction as the output light traverses the thickness of the output mirror. Accordingly, since the beam exiting the laser tube is slightly divergent, the reflected light from the videodisc, even though small in intensity, is, conversely (provided the system is in focus), convergent as it passes in reverse direction through the diverging lens and on toward the output of the laser device and beyond to the conjugate point where it forms a real image of the source plane wave (i.e., an image of the plane wave at the beam waist within the laser tube), thus eliminating the need for a relay lens. The present invention makes use of this slight divergence and convergence of the incident and reflected beams, respectively, at the exit end of the modulator to effect monitoring of the focus condition of the writing beam by monitoring the real image of the source plane wave at the conjugate point.

Another object of the invention is to provide the focus monitoring characteristics described above without adding additional optical elements in the writing beam path.

BRIEF DESCRIPTION OF THE DRAWINGS

The invention will now be described in detail having reference to the accompanying drawings in which.

DESCRIPTION OF THE PREFERRED EMBODIMENTS

Figure 1:
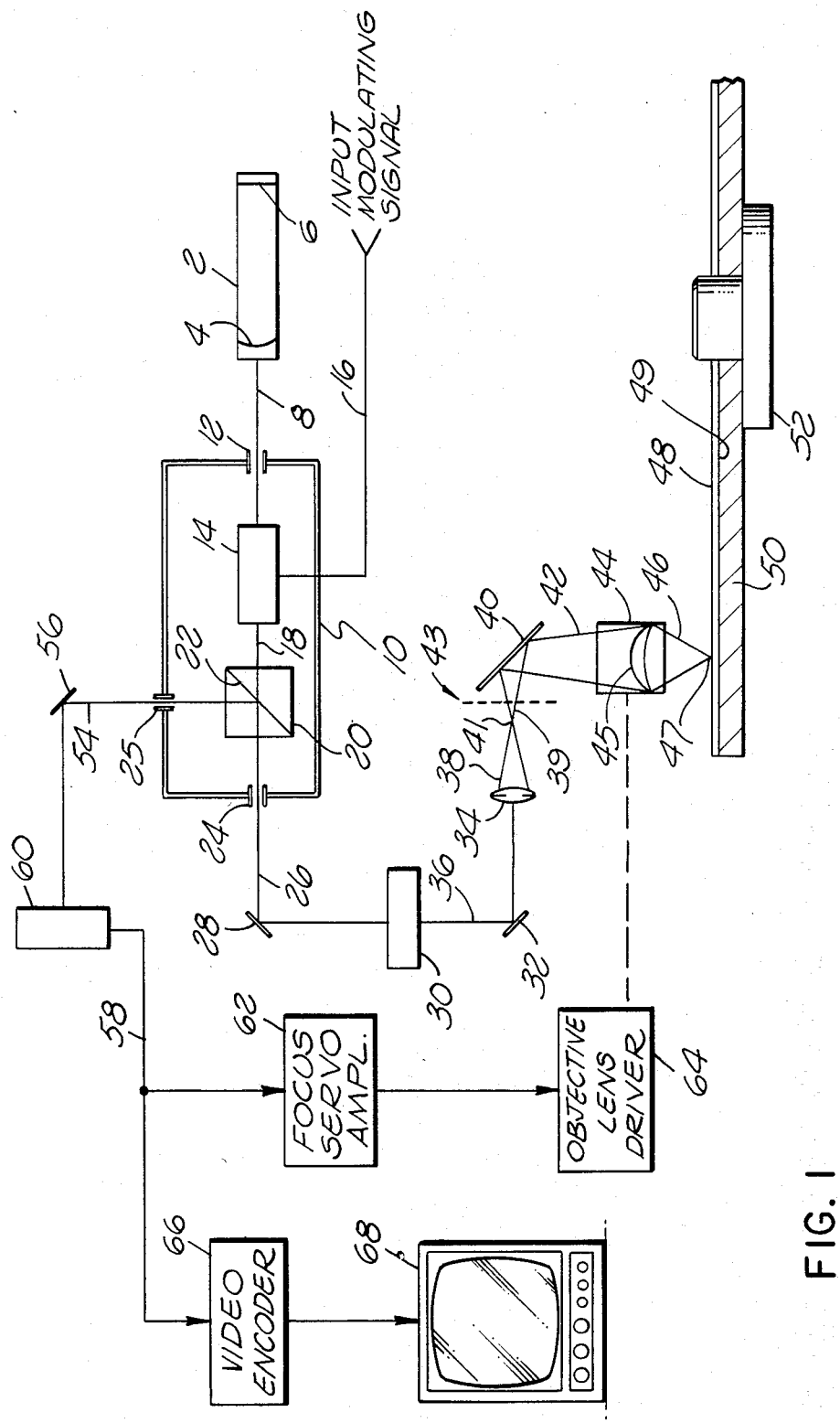
FIG. 1 is a schematic representation of the implementation of the present invention, showing the complete optical path between the laser light source and a videodisc.

The diagram of FIG. 1 shows, schematically, the basic elements involved in the focus monitoring system according to the present invention. The length of the portions of the light beam path shown in FIG. 1 do not necessarily represent corresponding lengths in the actual light path in a videodisc mastering machine. However, the principles involved with this invention are appropriately illustrated, and any deviation from actual scaled lengths and angles of the optical paths shown in the figures of this application are intentional for ease of description and analysis.

A high intensity light source 2, preferably an Argon ion laser is employed to generate the writing beam. A Pockels cell 14 and Glan prism 20 make up a light beam modulator 10 which modulates the laser beam with video information defining the input modulating signal on line 16. As is known, the Pockels cell 14 responds to the applied video signal by rotating the plane of polarization of the light beam 18. Since a linear polarizer transmits light only in a predetermined polarization plane, a polarizer, in the form of Glan prism 20, is included in the writing beam path to provide a modulated writing beam 26. As illustrated, the light beam from laser 2 enters a port 12 of modulator 10 and emerges from a port 24 to strike a first mirror 28 that directs the writing beam 26 through a quarter-wave plate 30 which converts linearly polarized light into circularly polarized light. The circular polarized light beam 36 is then diverted by second mirror 32 toward a diverging lens 34. It should be appreciated that the light beam exiting laser source 2 is collimated and that none of the optical elements described to this point have any effect on the collimated nature of the beam. That is, if it is assumed that the light beam from laser 2 is substantially planar and parallel, neither Pockels cell 14, Glan prism 20, mirrors 28 and 32, or quarter-wave plate 30 affect the parallel or planar nature of the beam.

Diverting lens 34, however, alters the planar nature of the beam and causes the beam so affected to have a converging conical shaped portion 38, a waist portion 41, and a diverging conical portion 39, 42, the portion 42 being a redirected continuation of portion 39 caused by mirror 40. For optimum resolution, the optical characteristics of diverting lens 34 and the length of the path chosen are such that the writing beam 42 substantially fills the entrance aperture of an objective lens assembly 44 comprising objective lens 45 which creates a large angle converging beam portion 46 to a focal point 47 on the recording surface 48 of a videodisc 50 mounted on a spindle 52.

As is commonly known in the art, in a videodisc mastering machine, the writing beam is focussed to a spot on the order of 0.6 microns on a layer of photoresist 49. The light beam modulated by the input modulating video signal in frequency modulated form is thus transferred to the surface of the videodisc by the modulated light beam which directly exposes the photoresist in correspondence to the modulated video signal, so that later development of the photoresist layer produces pits at the exposed site, assuming positive photoresist is used. However, since the transparent photoresist layer is substantially unaltered in its physical makeup, only a small amount of the incident light beam is reflected from the surface back through the objective lens 45, through diverting lens 34, quarter-waveplate 30, and onto the prismatic surface 22 of Glan prism 20. Approximately 1% to 2% of the incident light is reflected from the photoresist layer, and with a 100 miliwatt laser source 2, approximately 0.5 miliwatts of light energy is available along path 54 exiting Glan prism 20 through port 25 of modulator 10. The reflected beam 54 is directed by mirror 56 to transducer 60 which produces output signals on cable 58, the use and processing of which will be detailed later in this description. However, it can be noted from FIG. 1 that the output of transducer 60 may be used in one or both of the two functional arrangements 66, 68 and 62, 64. That is, the output of transducer 60 may be video encoded in encoder 66 for display on a video monitor 68, or the output of transducer 60 can be processed in focus servo amplifier 62 to drive an objective lens driver 64 to automatically maintain focus of the writing beam on the photoresist layer 49.

Several observations can be made from the above descriptive analysis of FIG. 1. First, it should be noted that the single line representation of beam portions 8, 18, 26, and 36 suggest that the light beam along these portions of the path maintain the light beam in coherent collimated form, and through reverse optical analysis, the reflected beam from the surface of videodisc 50 is also in collimated form in the portion of the path 36, 26, 54. That is, since the light beam impinging the videodisc surface is perpendicular to the disc, the diverging beam portion 38 of the reflected beam is returned to parallel rays through diverging lens 34. Accordingly, the reflected light beam reaching transducer 60 is, at least from an idealized viewpoint, substantially planar and parallel. As will be discussed in detail later, the particular characteristics of the laser device alters the collimated nature of the emerging beam, and the underlying concept of the present invention is based upon this slight deviation from the idealized laser model.

It is also to be noted that in prior art mastering machines, the modulator 10 had only two ports, an entry port 12 and an exit port 24. The small amount of light energy returned to the modulator 10 along beam portion 26 was absorbed as being useless, or totally ignored. An important advancement in the art attributed to the present invention involves a slight modification of existing modulators by simply providing an additional aperture or exit port 25 so that the reflected beam portion 54 can be rendered useful by a new technique utilizing the collimated reflected light beam portion 26, 54 heretofore thought to be void of any functional value. That is, since it was thought that the incident and reflected beams at the modulator were collimated, no intelligence information could be extracted from either the incident or reflected beam since no change in size, shape, or profile, of the beam was expected. The present invention, however, is specifically designed to operate in response to changes of beam portion 54, at the discovery that such changes are representative of change of focus conditions of the beam impinging the disc.

Figure 2:
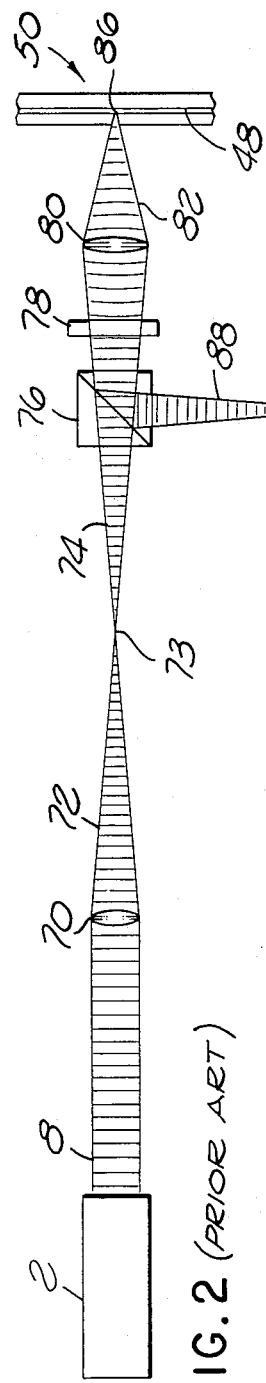
FIG. 2 is an illustration of the optics incorporated in a prior art focussing mechanism associated with a videodisc player.

In FIG. 2, an in-line representation of the optical path of a modern videodisc player is shown. A similar optical path is shown and described in greater detail in the aforementioned U.S. application Ser. No. 131,513. In FIG. 2, a laser source 2 emits a substantially collimated beam 8 which passes through diverging lens 70 to form a diverging conical beam portion 72, a waist 73, and diverging conical beam portion 74. The later beam portion passes through polarizing beam splitter cube 76 and quarter-wave 78 and is finally converged by objective lens 80 to impinge the surface 48 of videodisc 50 at a focussed point 86. The surface of a prerecorded videodisc is a highly reflective metallized surface which reflects the beam in reverse direction along the same path as the incident beam until it reaches the beam splitting cube 76 which diverts the reflected beam in a continuing converging conical portion 88 to arrive at a focus point 90 at which a photodetector is placed for purposes of signal recovery. As explained earlier, additional elements can be placed around the converging light beam portion 88 to produce automatic focus servo control signals for moving the objective lens 80 along the optical path to return the beam impinging the information surface of the videodisc to a focus condition.

In any defocussed condition of the beam impinging the disc, the diameter of the conical shaped beam portions at any spatial point will be altered correspondingly, and as mentioned earlier in this description, a cylindrical lens in combination with a quadrature focus detector can serve to monitor and correct for a non-circular cross section of the beam being monitored. In all cases, the focus changes detected are a result of the fact that the point of detection lies in a portion of the reflected beam that is either converging or diverging. In one embodiment, the reflected beam is split off in the diverging portion of the incident beam portion 74, i.e., it is placed at position 43 of the diverging beam portion 39 as shown in the overall system drawing of FIG. 1. In this way, the distance from 73 to 76 is equal to the distance from 76 to 90 when the system is in focus (FIG. 2). Although other optical devices would be required, it is also possible to place the beam splitter 76 in the converging portion 72 of the beam shown in FIG. 2. It would not be expected that any focus error could be detected by placing the beam splitter 76 in the collimated portion of the beam 8 exiting laser 2 shown in FIG. 2.

Figure 3:
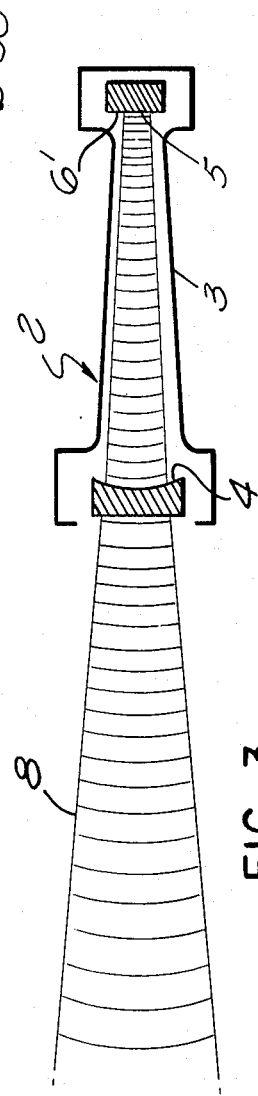
FIGS. 3 and 3a are, respectively, hemispherical and con-focal laser cavity resonators illustrating the principle of operation of a laser light source, and showing two possible locations for plane waves within the devices.
Figure 3A:
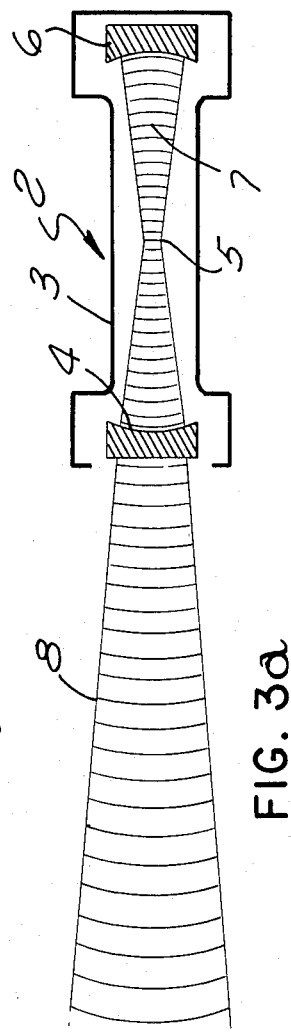

FIG. 3a shows a laser cavity. As pumping energy enters the confinement tube 3, the excited atoms radiate. Surfaces of constant phase are drawn as shown by leadlines 5 and 7 to show the curvature of the standing waves within the cavity. At the end plates 4 and 6, the surfaces of equal phase and the mirror surface are coincident. At the position where the beam is minimum in cross section, the surfaces of equal phase have become planar, i.e., at the beam waist 5. Thus, a perfectly collimated beam exists only at surface 5. The intensity profile of surface 5 is defined in strict accordance with the laws of diffraction, i.e., the surfaces of constant phase coincide with the mirror surfaces, and a stable cavity is achieved. Passage of the output light through the glass substrate of the output mirror 4 further diverges the beam according to the laws of refraction.

Stable laser cavity resonators range from plane parallel mirrors to the confocal variety. In the preferred embodiment, the laser cavity configuration is of the hemispherical type (FIG. 3) that consists of a flat maxreflector 6 and a curved output mirror 4 whose radius of curvature is equal to or greater than the mirror spacing. In this case, the plane wave 5 and beam waist is located at surface 6. Lines of equal phase are also shown in FIG. 3.

With reference to FIGS. 1 and 3, a close analysis of the construction of the type of argon ion laser used to create the writing beam reveals that, while the laser device 2 is of a parallel-planar laser structure, the partially reflecting end plate 4 is slightly concave inwardly, although the reflecting end plate 6 is planar. FIG. 3 illustrates this characteristic of a laser device 2 in a tube 3 having the partially reflecting end plate 4 at the left in FIG. 3 and the planar reflecting end plate 6 at the right side of FIG. 3. As the pumping radiation enters the tube 3, the excited atoms radiate light which bounces back and forth between end plates 4 and 6 until it exits through the partially reflecting end plate 4. In a typical writing laser, the reflection coefficient of end plate 6 is close to 100%, while the reflection coefficient of end plate 4 is close to 98%. To improve the efficiency of the laser device and maintain controlled reflections between the two end plates, end plate 4 is slightly concave, as shown greatly magnified in FIG. 3 for illustration purposes. For the reasons given earlier in this description, for all practical purposes, and from a purely theoretical viewpoint, the beam diverges from its axis at an angle of approximately 1 milliradian. As a result of the diverging beam 8, a theoretical conjugate focal point does indeed exist created by the laser device itself as attributed to diffraction and refraction, due to the non-infinite extent of the plane wave at 5 and the respective curvature of end plate 4.

Figure 4:
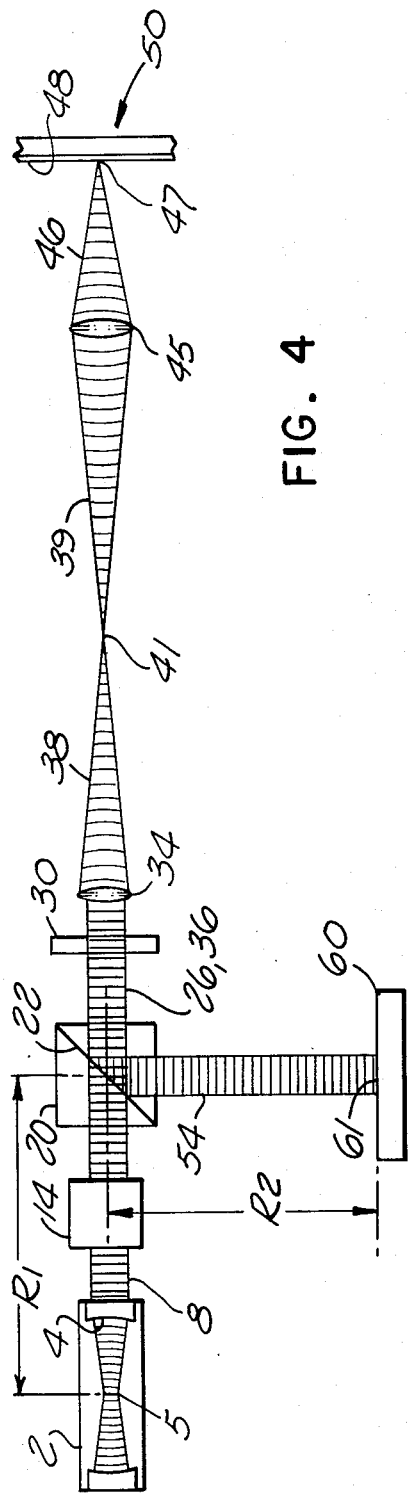
FIG. 4 illustrates the optical principle upon which the present invention is based to monitor the focussing condition of a writing beam sensed at the exit end of a light beam modulator.

Reference is now made to FIG. 4 wherein the components of importance for the purposes of describing the invention are shown in-line, and the reference numerals used are the same as those found in the more descriptive illustration of FIG. 1. It will be noted that no new optical elements have been added to the optical path between the laser source 2 and the videodisc 50. However, an opening 25 in the modulator housing 10 (shown in FIG. 1) is required to permit the beam portion 54 to strike transducer 60. With the analysis in mind from the description of FIG. 3, it can be appreciated that, since there is a theoretical conjugate point created by the laser device 2, and since the beam portion 54 reaching transducer 60 is a result of a reflected beam from videodisc 50, any change in the position or orientation of the optical elements affecting focus of the light beam on the surface of videodisc 50 will also have an effect on the shape and/or size of the beam reaching transducer 60.

Note should be made of the fact that when the system is in focus, due to the absence of the slightly divergent element 14 from the beam portion 54, the distance R1 from the plane wave 5 to the prismatic surface 22 at the midpoint of the beam splitter 20 is longer than the distance R2 of the return beam 54 from the prismatic surface 22 of the beam splitter 20 to the sharpest image 61 of the plane wave 5 at transducer 60. Thus, when distance R2 is longer or shorter than that which gives the minimum diameter sharpest plane wave image 61 when the system is set at optimum focus as determined from a standard production record-develop-playback calibration sequence, the beam profile at detector 60 increases in diameter due to the larger circle of confusion of the light patches that make up the plane wave image 61 of plane wave 5. That change in profile can be detected to determine any out-of-focus condition of the writing beam. Typically, the sharpest plane wave image 61 is on the order of 1 to 2 millimeters in diameter.

Figure 5:
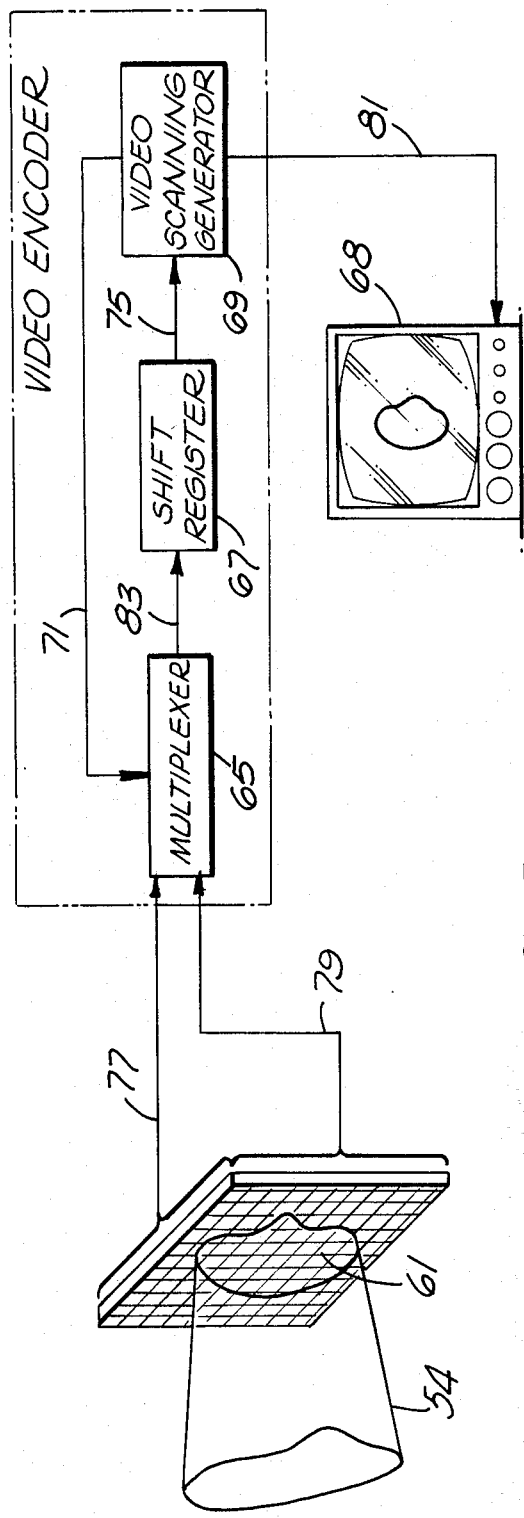
FIG. 5 shows a block diagram of the electronics which may be used to process the output of a photocell matrix for display on a video monitor.

In FIG. 5, a three dimentional model of the transducer 60 is shown. In use, transducer 60 is preferably comprised of a matrix of 256 by 256 photocells, each photocell being square shaped and approximately 0.001 inches in length. Photocell matricies of this nature are available in large scale integrated circuit form from various manufacturers, and the basic concept of intercepting a light beam with a photocell matrix is not to be considered a part of this invention.

In FIG. 5, a preferred form of the invention is shown wherein the output connections from the photocell matrix are combined in multiplexer 65 to form a continuous and repeating train of pulses each being of a magnitude corresponding to the intensity of light falling upon a corresponding cell in the matrix of over 65,000 cells. Clocking of the pulses into shift register 67 is provided by a video scanning generator 69 which receives the pulse train on line 75 in synchronized order so as to insert the different amplitude levels corresponding to each cell on the appropriate horizontal scanning line and at the proper location on such horizontal scanning line prior to being fed to a video monitor which then indicates, by intensity modulating the scanning beam, the profile 61 of the intercepted beam portion 54 striking transducer 60.

Although the angle of convergence of beam 54 is small, the cell structure and size as described above are sufficient to permit detection of even small out-of-focus conditions of the writing beam. Although the cross section of beam 54 impinging transducer 60 is theoretically circular, in practice it is not necessarily, and, after calibrating the mastering machine for optimum focus by the empirical method described earlier, the profile of the sharpest plane wave image 61 displayed on a video monitor is recorded as a reference profile against which a comparison will be made each time the focus condition of the mastering machine is to be optimized. A sophisticated arrangement for recording the reference profile is to use a computer to register the value of each signal generated by the impingement of light on each cell. A simpler and more practical and direct method is to merely draw the shape of the reference profile with a grease pencil on the screen of the video monitor. Periodical checks on the focus condition can then be instantaneously monitored by observing the deviation of the display on the video monitor at any point in time relative to the reference profile previously drawn on the screen.

It can be appreciated that the system just described does not operate to monitor directly the focussed beam at the surface of the videodisc in an absolute sense. Accordingly, an initial calibration of the mastering machine is necessary in order to bring the machine into optimum focus condition, and then the reference profile is recorded for future reference. Calibration can be empirically derived by the method described earlier in this application, whereby a series of optical changes are made while actually recording program material, and upon playback of the various recorded portions, optimum focus is found by noting optimum playback characteristics of the videodisc on a calibrated player. However, once a reference profile is established, optimum focus of the mastering machine can be effected by periodically bringing the monitored beam sensed by transducer 60 into registration with the reference profile previously recorded, and this is presently done on a daily basis. It is estimated that the use of matching profiles according to this invention saves approximately one hour of down time per day for each mastering machine. Accordingly, the objects set forth in the beginning of this description are met.

While the invention has been particularly shown and described with reference to a preferred embodiment and alterations thereto, it should be understood by those skilled in the art that various changes in form and detail may be made therein without departing from the spirit and scope of the invention.

I claim:

1. A method for monitoring the focus condition of a writing light beam impinging upon the writing surface of a recording medium, comprising the steps of:

providing a source of high intensity light to form a writing light beam;

directing said light beam through a signal-responsive light beam modulator;

passing the modulated beam from the modulator along a path through a quarter-wave plate and an objective lens to impinge, in focussed condition, incident upon the writing surface of the medium;

directing the light beam reflected from the medium in a reverse direction along said path through the objective lens, the converging lens, and the quarter-wave plate, and to the modulator;

diverting the reflected light beam reaching the modulator out of the path of the incident writing beam and onto a light sensitive transducer;

sensing the output signal of the transducer to monitor the focus condition of the writing beam at the surface of the medium;

preserving a recording of the profile characteristics of the beam impinging the transducer when the writing beam impinging the surface of the medium is in focus, to define a reference profile; and when the writing beam impinging the surface of the recording medium is out of focus, adjusting the optics affecting focus of the writing beam on the recording medium until the beam impinging the transducer assumes said reference profile.

2. The method as claimed in claim 1, wherein said optics adjusting step includes adjusting said objectivelens along said beam path.

3. The method as claimed in claim 1, wherein said optics adjusting step includes adjusting said source of high intensity light longitudinally of said writing light beam.

4. The method as claimed in claim 1, wherein said optics adjusting step includes adjusting the spacing between the transducer and the modulator beam splitter.

5. The method as claimed in claim 1, wherein said light beam modulator is of the type having a Pockels cell receiving the writing beam from the source, followed by a Glan prism downstream of the Pockels cell, and said diverting step includes the step of:

diverting the reflected beam reaching the modulator by deflecting the reflected beam off of the forward most prism surface of the Glan prism and onto the transducer.

6. Apparatus for monitoring the focus condition of a writing light beam impinging upon the writing surface of a recording medium, comprising:

a source of high intensity light forming a writing light beam;

a signal-responsive light beam modulator in the path of said light beam;

a quarter-wave plate in said path downstream of said modulator;

a diverging lens in said path downstream of said quarter-wave plate;

an objective lens in said path receiving said light beam from said diverging lens and focussing said light beam onto the writing surface of said recording medium, said objective lens, said diverging lens, and said quarter-wave plate being arranged to receive said light beam after reflection from said writing surface of said medium and to direct said beam toward said modulator, said modulator including means for diverting the reflected light beam reaching the modulator out of the path of the incident writing beam;

a light-sensitive transducer in the path of the reflected light beam diverted by said diverting means for producing an output signal varying in correspondence with the focus condition of said writing beam at the surface of said medium;

means for indicating the profile characteristics of the beam impinging the transducer when the writing beam impinging the surface of the medium is in focus, to define a reference profile; and means for adjusting the optics affecting focus of the writing beam on the recording medium, when the writing beam impinging the surface of the recording medium is out of focus, until the beam impinging the transducer assumes said reference profile.

7. The apparatus as claimed in claim 6, wherein said adjusting means includes means for adjusting said objective lens along said beam path.

8. The apparatus as claimed in claim 7, wherein said adjusting means comprises a focus servo loop including a focus servo amplifier and an objective lens driver, said servo amplifier being responsive to, and producing a focus error signal dependent upon, the difference between the instantaneous profile of the reflected writing beam impinging the transducer and said reference profile.

9. The apparatus as claimed in claim 6, wherein said adjusting means includes means for adjusting said source of high intensity light longitudinally of said writing light beam.

10. The apparatus as claimed in claim 6, wherein:

said beam modulator is of the type having a Pockels cell receiving the writing beam from the source, followed by a Glan prism downstream of the Pockels cell; and said transducer is arranged to receive the beam reflected off of the forward most prism surface of the Glan prism.

11. A method for monitoring the focus condition of a writing light beam impinging upon the writing surface of a recording medium, comprising the steps of:

providing a source of high intensity substantially collimated light to form a writing light beam;

directing said light beam through a signal-responsive light beam modulator;

passing the modulated light beam from the modulator through a diverging lens and along an optical path to impinge, in focussed condition incident upon the writing surface of the medium, directing the light beam reflected from the medium in a reverse direction along said optical path to present a substantially collimated reflected light beam to the modulator;

diverting the reflected light beam reaching the modulator out of the path of the incident writing beam and onto a light sensitive transducer;

sensing the output signal of the transducer to monitor the focus condition of the writing beam at the surface of the medium;

preserving a record of the profile characteristics of the beam impinging the transducer when the writing beam impinging the surface of the medium is in focus to define a reference profile; and when the writing beam impinging the surface of the recording medium is out of focus, adjusting the optics affecting focus of the writing beam on the recording medium until the beam impinging the transducer assumes said reference profile.

12. The method as claimed in claim 11, wherein:

said diverting step includes directing the diverted light beam by an optical surface of said modulator onto a plurality of closely spaced transducer cell elements so that the beam strikes a plurality of such elements;

said preserving step includes the steps of:

displaying the cell element positions and brightness levels of all cell elements on a video monitor; and forming on the screen of the video monitor an outline of the intensified display on the monitor to define reference profile; and wherein said adjusting step includes adjusting the optics affecting focus until the intensified display on the monitor assumes the same outline as for said reference profile.

13. The method as claimed in claim 11, wherein said light beam modulator is of the type having a Pockels cell receiving the writing beam from the source, followed by a Glan prism downstream of the Pockels cell, and said diverting step includes the step of:

diverting the reflected beam reaching the modulator by deflecting the reflected beam off of the forward most prism surface of the Glan prism and onto the transducer.

14. Apparatus for monitoring the focus condition of a writing light beam impinging upon the writing surface of a recording medium, comprising:

a source of high intensity substantially collimated light forming a writing light beam;

a signal responsive light beam modulator in the path of said light beam;

means defining an optical path for diverging said light beam and for impinging the modulated beam from the modulator, in focussed condition, onto the writing surface of said medium, said optical path being arranged to receive said light beam after reflection from said writing surface of said medium and to direct said beam in substantially collimated form to said modulator, said modulator including means for diverting the reflected substantially collimated light beam reaching the modulator out of the path of the incident writing beam;

a light-sensitive transducer in the path of the reflected light beam diverted by said diverting means for producing an output signal varying in correspondence with the focus condition of said writing beam at the surface of said medium;

means for indicating the profile characteristics of the beam impinging the transducer when the writing beam impinging the surface of the medium is in focus to define a reference profile; and means for adjusting the optics affecting focus of the writing beam on the recording medium upon finding that the writing beam impinging the surface of the recording medium is out of focus, until the beam impinging the transducer assumes said reference profile.

15. The apparatus as claimed in claim 14, wherein:

said beam modulator is of the type having a Pockels cell receiving the writing beam from the source, followed by a Glan prism downstream of the Pockels cell; and said transducer is arranged to receive the beam reflected off of the forward most prism surface of the Glan prism.

16. The apparatus as claimed in claim 14, wherein said light-sensitive transducer is a matrix of photoelectric cells and includes means for outputting a signal representative of the amount of light striking each cell.

17. The apparatus as claimed in claim 16, including a display device receiving said signal representative of the amount of light striking each cell and displaying, simultaneously, indicia corresponding to the amounts of light striking all cells.

18. The apparatus as claimed in claim 17, wherein said display device is a video monitor having a raster intensified at locations and brightness levels referenced to corresponding cell positions in said matrix and light levels striking said corresponding cells, respectively.

19. The apparatus as claimed in claim 16, wherein said matrix comprises a plurality of rows and a plurality of columns of said photoelectric cells, each said cell being substantially square and having side dimensions of approximately 0.001 inches.

* * * * *